Figure 1:
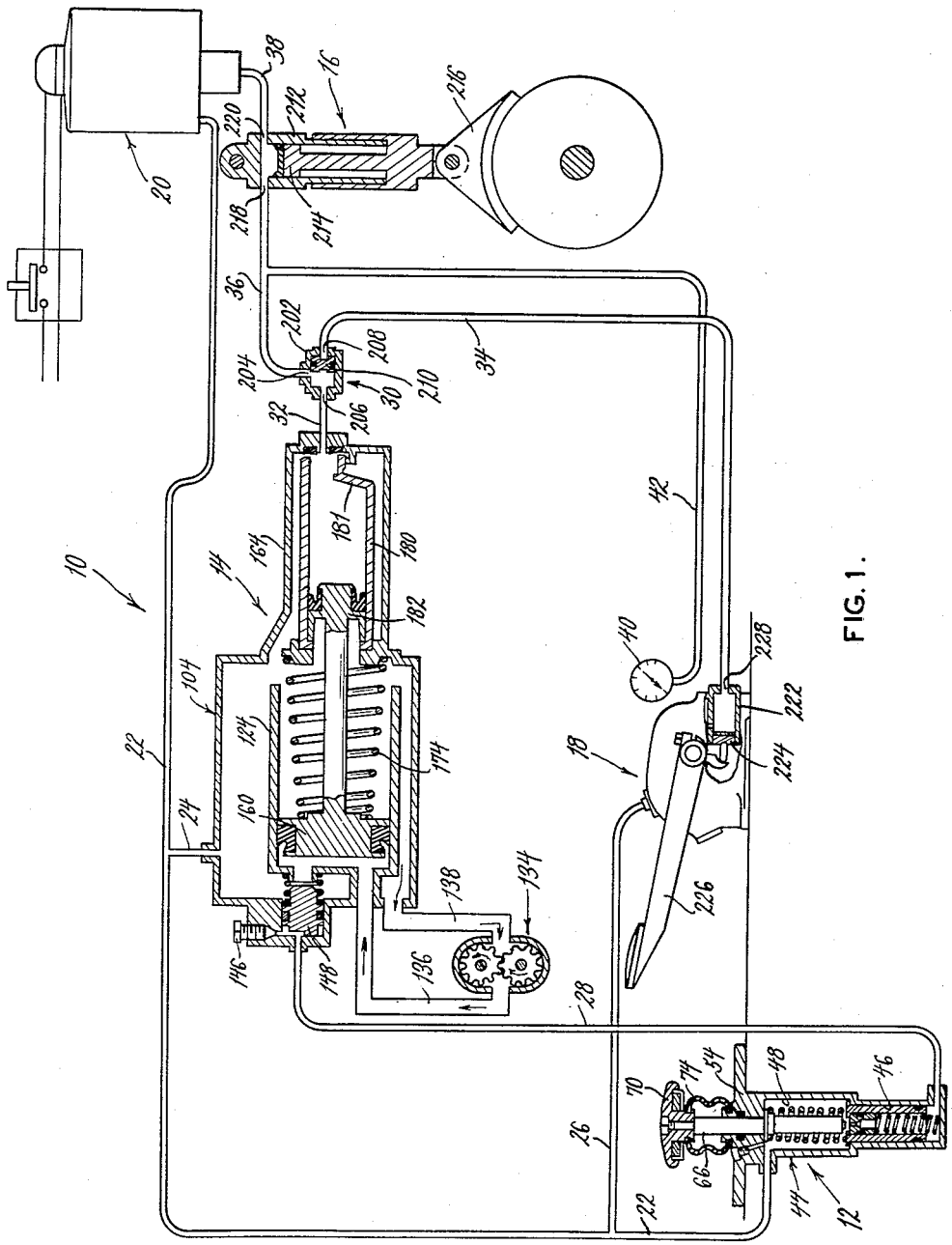

Aug. 26, 1958   S. SCHNELL   2,848,876
POWERED HYDRAULIC BRAKE ASSEMBLY
Filed Aug. 9, 1952   3 Sheets-Sheet 1

INVENTOR.
STEVE SCHNELL
BY *Gravely, Lieder,*
*Woodruff & Dees*
ATTORNEYS

Aug. 26, 1958  S. SCHNELL  2,848,876
POWERED HYDRAULIC BRAKE ASSEMBLY
Filed Aug. 9, 1952  3 Sheets-Sheet 2
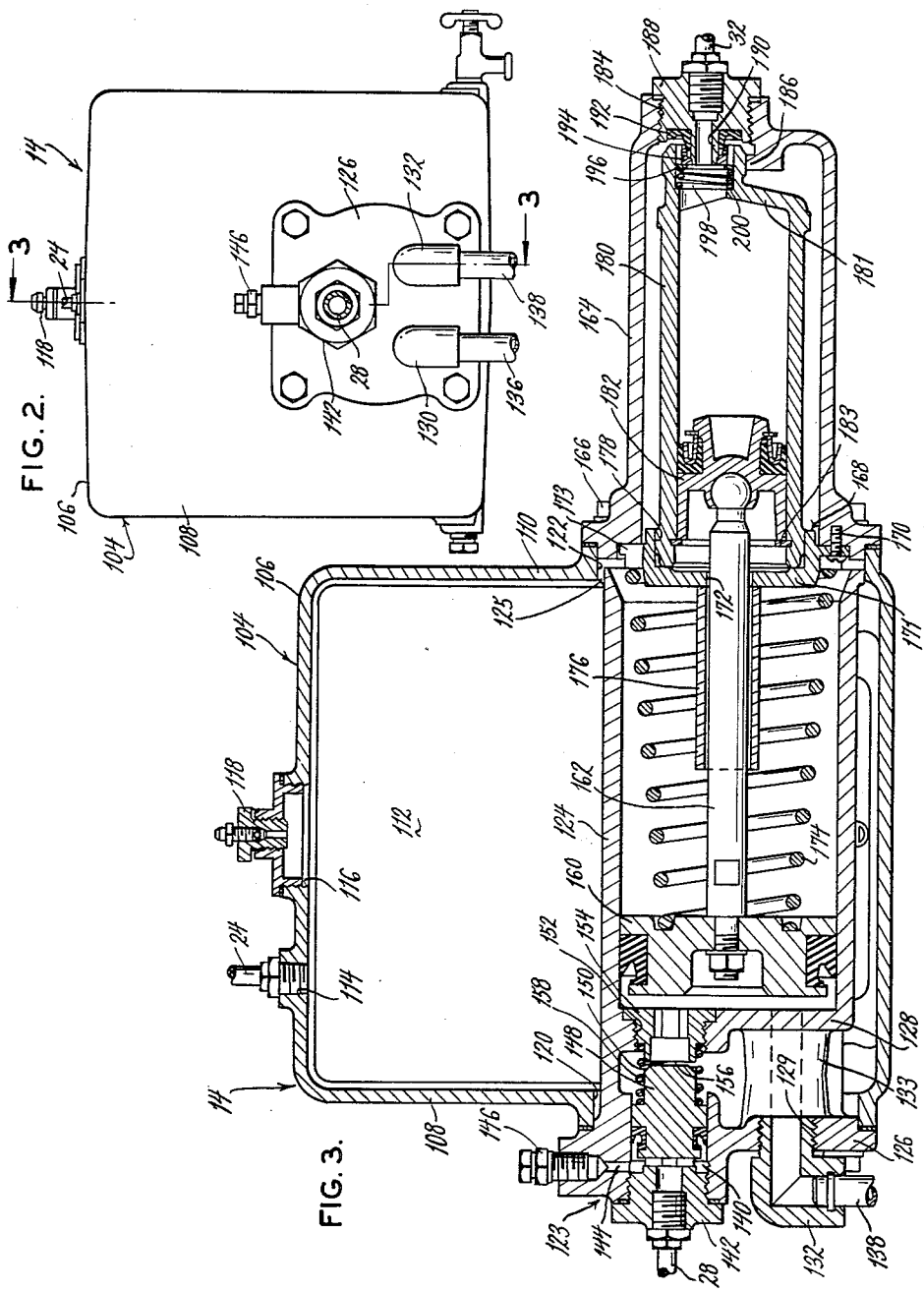
INVENTOR.
STEVE SCHNELL
BY
ATTORNEYS Aug. 26, 1958  S. SCHNELL  2,848,876
POWERED HYDRAULIC BRAKE ASSEMBLY
Filed Aug. 9, 1952  3 Sheets-Sheet 3

INVENTOR.
STEVE SCHNELL
BY
ATTORNEYS

United States Patent Office 2,848,876
Patented Aug. 26, 1958

2,848,876
POWERED HYDRAULIC BRAKE ASSEMBLY

Steve Schnell, Kirkwood, Mo., assignor to Wagner Electric Corporation, St. Louis, Mo., a corporation of Delaware Application August 9, 1952, Serial No. 303,565

7 Claims. (Cl. 60—54.6)

The present invention relates generally to industrial brakes and more particularly to a novel powered hydraulic brake assembly which is especially suitable for use with crane bridge drives. Although the present invention is shown and described as used in a crane bridge drive, it is to be understood that it is equally applicable for use with other types of idustrial equipment such as whirler cranes, coke pushers, coal charging cars, larry cars, door machines, large wheel balancers, and the like.

The known bridge brakes for use in the industrial field have proven to be quite positive in operation and extremely safe so long as the various physical limits are not exceeded. One of these physical limitations concerns fluid displacement, which unfortunately increases with lining wear unless an automatic compensation device is provided. Also, the manually operable control for the control cylinder in the known bridge brake assemblies has a limited pedal travel and consequently is limited in the amount of fluid which it can displace. Therefore, as displacement increases with lining wear it becomes necessary to make frequent manual brake adjustments if automatic adjusting devices are not employed. Furthermore, in the known constructions, the pedal travel required to provide the necessary fluid displacement tends to cause the bridge brake operators to hold a residual braking pressure in order to eliminate the necessity of a long pedal stroke with every brake application, thereby causing increased lining wear.

In addition, the known industrial brake installations are usually limited to two brake units because the manually operated control cylinder is unable to displace sufficient fluid to operate additional brake units. Furthermore, because the operator physically produces the actuating pressure in the known devices, the physical limitations of the operator have to be taken into consideration in determining the maximum pressure which can be produced at the brakes.

It is an object of the present invention therefore, to provide a novel powered hydraulic brake assembly for producing the desired braking pressure regardless of the fluid displacement required.

Another object is to provide a novel powered hydraulic brake assembly which requires less manual effort on the part of the operator than when known assemblies are used, regardless of the number of brake units being actuated.

Another object is to provide such a brake assembly which is practically unaffected by lining wear, so far as effective operation is concerned.

Another object is to provide such an assembly in which the pedal travel of the control device is appreciably reduced and maintained at a substantially fixed value regardless of the number of brake units controlled thereby, or the extent of wear of the brake linings.

Another object is to provide a novel control device for bridge brake assembly which will eliminate the tendency of the operators to "drag" the brakes in preference to using a long pedal stroke as required in the presently known devices.

Another object is to provide a novel control device for controlling the output of a fluid pressure source which provides the necessary "feel" so that the operator has an indication of the amount of the pressure applied to the braking units. More particularly it is an object to provide such a valve in which the force resisting the movement of the operating parts of the valve increases with an increase in the pressure applied to the braking units so as to provide the necessary "feel" to the operator and thereby prevent too abrupt an application of the brakes, or an over-application of the brakes.

Further objects and advantages of the present invention will be apparent from the following detailed description, reference being had to the accompanying drawing wherein a preferred embodiment is shown.

Briefly, the invention comprises a brake shoe actuating cylinder connected to the output of a power cluster, the latter including a piston reciprocably mounted within a cylinder, fluid pressure producing means for circulating fluid through the cylinder to one side of the piston, means for restricting the flow of fluid from the cylinder to cause a fluid force to be applied to the piston to move the same; and a manually operable control valve for producing a yieldable fluid pressure for actuating the flow restricting means.

Figure 4:
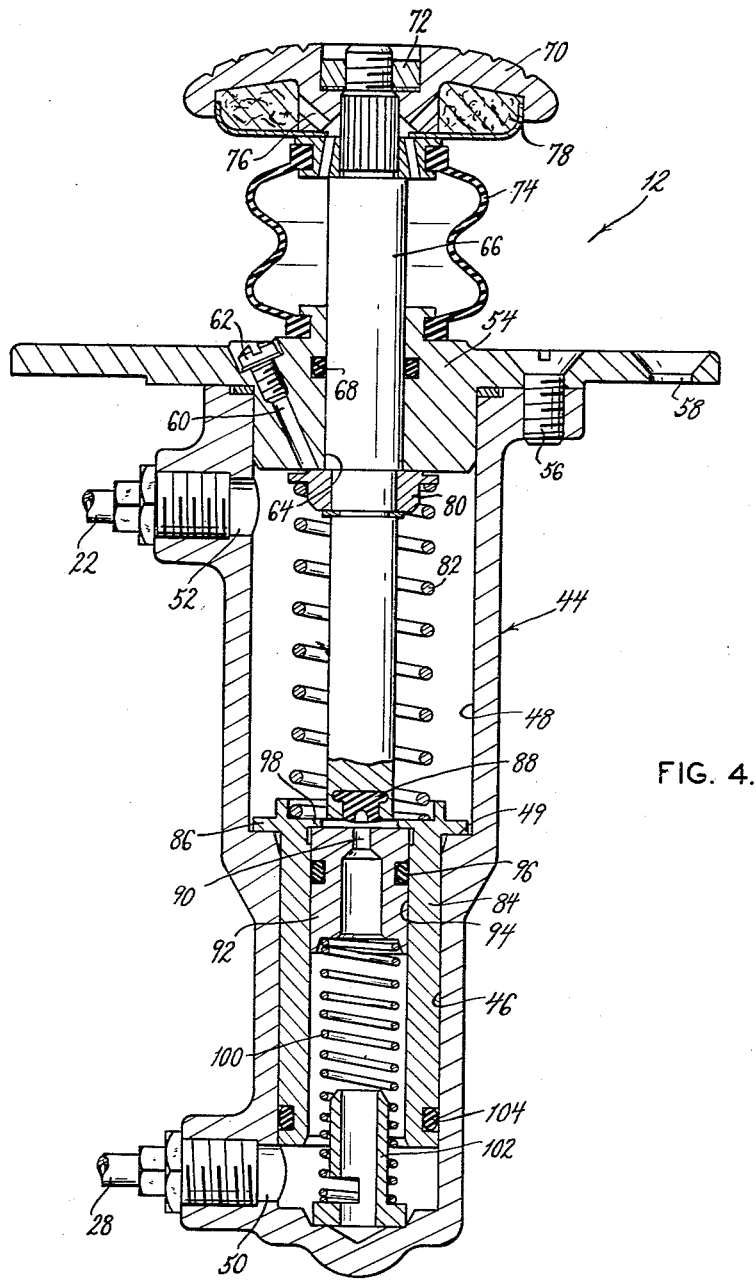

In the drawings:

Fig. 1 is a schematic view of a powered hydraulic brake assembly constructed in accordance with the teachings of the present invention, only the more basic parts of the various units being shown in order to simplify the view as much as possible, Fig. 2 is an end elevational view of the actual power cluster shown schematically in Fig. 1, Fig. 3 is a sectional view of the power cluster taken on the line 3—3 in Fig. 2, showing the preferred construction of the working parts of the unit, and Fig. 4 is an enlarged longitudinal sectional view of the actual power control valve shown schematically in Fig. 1.

Referring to the drawings more particularly by reference numerals, specifically Fig. 1, 10 indicates generally a novel powered hydraulic brake assembly embodying the teachings of the present invention. The assembly 10 includes a novel power control valve 12 for controlling the output of a novel power cluster 14 which operates one or more conventional brake actuating cylinders 16. The brake actuating cylinders 16 can also be operated by a control cylinder 18 of conventional construction, and a remote control bleeder 20 is provided for removing entrapped air from the system and for serving as a primary reservoir of fluid.

A conduit 22 extends from the bleeder 20 to the power control valve 12, and contains a first branch 24 which is connected to the power cluster 14, and a second branch 26 which is connected to the control cylinder 18. Thus, by means of the conduit 22 and its branches 24 and 26, fluid is supplied at all times to the power control valve 12, the power cluster 14, and the control cylinder 18.

A conduit 28 is provided between the outlet end of the power control valve 12 and the inlet end of the power cluster 14 whereby actuation of the power control valve 12 will transmit fluid pressure to the power cluster 14 and cause operation thereof, as will be more fully described hereinafter.

Disposed between the power cluster 14 and the actuating cylinder 16 is a cross-over valve 30. One conduit 32 is connected between the outlet end of the power cluster 14 and the cross-over valve 30, and another conduit 34 is connected between the outlet of the control cylinder 18 and the cross-over valve 30, so that either the power cluster 14 or the control cylinder 18 can supply fluid pressure to the actuating cylinder 16, as will appear.

The actuating cylinder 16 is connected to the cross-over valve 30 by a conduit 36, and to the remote control bleeder 20 by a conduit 38.

A pressure gauge 40 is connected to the conduit 36 by means of a conduit 42, whereby the operator can determine the pressure in the actuating cylinder 16 at all times.

If desirable, additional brake actuating cylinders can be connected to the conduit 36.

The power control valve 12 (Fig. 4), which is mounted on the floor of the operator's cab (not shown), comprises a housing 44 containing a bore 46 in the lower end thereof, and a counterbore 48 above it and in axial alignment therewith. The upper counterbore 48 is of a slightly larger diameter than the bore 46 so as to provide a shoulder 49 therebetween. An outlet port 50 is provided at the lower end of the bore 46 for receiving the conduit 28, which is connected to the previously described power cluster 14. Adjacent the upper end of the counterbore 48 is a fluid inlet 52 which receives the conduit 22 whereby the counterbore 48 is placed in communication with the remote control bleeder 20. The upper end of the counterbore 48 is closed by a mounting plate 54 which is secured to the housing 44 by machine screws 56. Apertures 58 are provided in the mounting plate 54 for mounting the control valve 12 in the proper position on the floor of the control cab.

A bleeder passage 60 is provided in the mounting plate 54 and is normally closed by a sealing screw 62. This provides a means for removing the entrapped air in the upper part of the counterbore 48.

The mounting plate 54 is further provided with a bore 64 which slidably receives a vertically positioned shaft 66. An O-ring 68 is positioned between the outer periphery of the shaft 66 and the wall of the bore 64, as a seal. A foot pad 70 is mounted at the upper end of the shaft 66 and is secured thereto by a fastening means 72.

A boot 74 is secured to the pad 70 at its upper end and to the mounting plate 54 at its lower end to prevent dirt and other foreign matter from interfering with the vertical movement of the shaft 66.

Atmospheric ports 76 are provided in the foot pad 70 with a filter 78 at the ends of the ports to maintain atmospheric pressure within the boot 74 and, at the same time, to prevent the entrance of foreign material which is normally excluded by the boot.

The upward movement of the shaft 66 relative to the housing is limited by a stop member 80 mounted on the shaft 66 and adapted to abut the lower surface of the mounting plate 54. A spring 82 is disposed about the shaft 66 and biases it upwardly, the lower end of the spring 82 being supported on the upper end of a sleeve 84 which is slidably mounted in the bore 46 of the housing 44. The sleeve 84 can move upwardly but contains a flange 86 at its upper end which rests on the shoulder 49 so as to limit the downward movement of the sleeve 84 relative to the housing 44.

The lower end of the shaft 66 contains a valve element 88 which controls the opening of a port 90 provided in a piston 92. The piston 92 is slidably mounted in a bore 94 which is contained in the sleeve 84 and is provided with an O-ring seal 96 to prevent the passage of pressure fluid between the outer periphery of the piston 92 and the wall of the bore 94.

The upward movement of the piston 92 relative to the sleeve 84 is limited by an inwardly extending flange 98 provided on the sleeve 84.

A spring 100 is disposed in the bore 94 and normally biases the piston 92 against the flange 98. The lower end of the spring 100 is supported by a spring guide 102 which bears against the bottom wall of the bore 46.

The sleeve 84 carries an O-ring seal 104 at its lower end to prevent the passage of pressure fluid between the outer wall of the cylindrical sleeve 84 and the wall of the bore 46.

As previously described, the upper counterbore 48 is in communication with the remote control bleeder 20 through the conduit 22 and the port 52, so that it is always filled with fluid. Furthermore, when the shaft 66 is in its upper position (Fig. 4) with the valve element 88 spaced from the port 90, the fluid can flow downwardly from the upper counterbore 48, through the port 90, into the bore 94 of the sleeve 84, and thence outwardly through the outlet 50 and the conduit 28 to the power cluster 14.

Thus, under static pressure conditions, fluid fills the interior of the power control valve 12, and the conduit 28 between the valve 12 and the power cluster 14.

When the operator steps on the foot pad 70, the shaft 66 is moved downwardly against the action of the spring 82 until the valve element 88 seats against the upper end of the piston 92 and seals off the port 90. Thereafter, continued downward movement of the shaft 66 forces the piston 92 downwardly against the action of the spring 100 and exerts a pressure on the fluid in the conduit 28 so as to cause it to move through the conduit 28 toward the power cluster 14.

If the displacement of the fluid within the conduit is limited (which is the actual case, as will be described), continued downward movement of the shaft 66 and the piston 92 causes the sleeve 84 to be moved upwardly due to the fluid pressure applied against the lower end thereof. As previously mentioned, downward movement of the shaft 66 and the piston 92 is resisted by the springs 82 and 100. In addition, upward movement of the sleeve 84 relative to the housing 44, further compresses the spring 82 so that there is a double compression of it. Thus, the amount of force necessary to depress the foot pad 70 increases progressively and in stages so that the operator has the necessary "feel" during the braking action, as will more fully appear.

Turning now to a description of the power cluster 14 which is shown more particularly in Figs. 2 and 3, it will be noted that this part of the assembly includes a housing 104 which contains an upper wall 106 and opposed side walls 108 and 110, the upper portion of the housing providing a reservoir 112.

The upper wall 106 is provided with an inlet port 114 which receives the branch conduit 24, and a filler port 116 which has a filler and bleeder assembly 118 associated with it.

The opposed side walls 108 and 110 contain opposed axially aligned circular openings 120 and 122, respectively.

Mounted in the opening 120 is a power piston assembly 123 which includes a power cylinder 124, the latter extending across the housing 104 and having the right-hand end thereof supported in the opposed opening 122.

Spaced openings 125 are provided in the outer periphery at the right-hand end of the power cylinder 124 where it engages the wall of the opening 122 so as to provide fluid communication between the reservoir 112, the interior of the power cylinder 124, and a master cylinder, which will be described hereafter.

At the left end of the power piston assembly 123 there are spaced transversely extending walls 126 and 128, the outer wall 126 providing the closure member for the opening 120 and the inner wall 128 closing the left-hand end of the power cylinder 124.

Adjacent the bottom of the outer wall 126 are two horizontally spaced openings 129 (Fig. 3), one of which is provided with a pressure fitting 130 (Fig. 2) and the other with a suction fitting 132.

Extending between the two spaced walls 126 and 128, in alignment with the opening 129 (which receives the pressure fitting 130) is a tubular portion 133 which contains a passageway therethrough so as to connect the inlet fitting 130 with the space within the power cylinder 124 to the right of the inner wall 128. It will be noted that the suction fitting 132 is in communication with the space between the walls 126 and 128, which in turn is in communication with the main reservoir 112.

A gear pump 134 (Fig. 1) which is driven by an electric motor (not shown) is positioned adjacent the power cluster 14 and includes an outlet conduit 136 and an inlet conduit 138, which are connected to the pressure fitting 130 (Fig. 2) and the suction fitting 132, respectively.

Adjacent the upper end of the outer wall 126 of the power piston assembly 123 (Fig. 3) is a horizontal bore 140 which threadedly receives a fitting 142 in the outer end thereof, the latter receiving the end of the conduit 28 which leads from the pressure control valve 12.

A vertically extending bleeder port 144 is in communciation with the bore 140 to the right of the fitting 142, and contains a bleeder screw 146.

Slidably mounted in the bore 140 to the right of the fitting 142, is a by-pass piston 148. The left-hand end of the by-pass piston 148 contains short projections which are adapted to abut the fitting 142, and the right-hand end contains a tapered valve surface 150.

An internally threaded opening 152 is contained in the inner wall 128 in axial alignment with the bore 140, and mounted therein is a tubular insert 154 which has a valve seat 156 at the outer end thereof for receiving the valve surface 150 of the by-pass piston 148.

A coiled spring 158 is disposed between the insert 154 and the by-pass piston 148 urging the latter away from the insert 154 so as to maintain communication between the interior of the power cylinder 124 to the right of the inner wall 128, and the space between the inner and outer walls 128 and 126, and the reservoir 112.

Thus, when the gear pump 134 is in operation and the by-pass piston 148 is to the left, fluid is circulated from the gear pump 134, through the outlet conduit 136, the pressure fitting 130, the tubular portion 133, into the space to the right of the inner wall 128, and thence through the tubular insert 154, past the right-hand end of the by-pass piston and into the space between the inner wall 128 and the outer wall 126, and back to the gear pump 134 through the outlet fitting 132 and the conduit 138.

However, if the by-pass piston 148 is moved to the right against the action of the spring 158 by fluid pressure from the control valve 12 so as to contact the seat 156 on the insert 154, the fluid from the gear pump 134 is temporarily trapped within the power cylinder 124 to the right of the inner wall 128 so as to actuate the power piston and the master cylinder piston which will now be described.

A power piston 160 is slidably mounted within the power cylinder 124 and carries a push rod 162 which extends to the right and through the opening 122 in the housing 104.

Mounted within the opening 122 and extending to the right thereof is a master cylinder 164 which is fastened to the housing 104 by machine screws 166.

A cup-shaped guide and closure member 168 is fastened to the left-hand end of the master cylinder 164 by machine screws 170, and contains a wall 171 which has an opening 172 at the center thereof for slidably receiving the push rod 162. The member 171 also contains a radially extending flange portion 173 which contains spaced grooves and which is in contact with the end of the master cylinder 164. A coiled spring 174 is disposed about the push rod 162 between the flange portion 173 and the power piston 160 so as to urge the latter toward the left.

A sleeve 176 may be fitted over the push rod 162 abutting the left side of the guide member 168 to limit the rightward movement of the power piston 160 during its operation. Manifestly, the length of the sleeve 176 can be varied according to the required fluid displacement, which varies with the number of brake units used with the assembly.

Extending rightwardly from the wall 171 of the guide enclosure member 168 is a tubular portion which has a smooth inner wall surface 178 and which forms a cup-like support.

A master cylinder barrel 180 is disposed within the master cylinder 164 and is carried within the cup-like support in sliding engagement with the inner wall surface 178, the right-hand end of the barrel 180 being open and containing a radially extending wall 181.

The outer surface of the barrel 180 is spaced inwardly from the inner surface of the master cylinder 164 so as to provide a fluid receiving space which is at all times in communication with the reservoir 112 through the openings 125 and the grooves in the flange portion 173.

Slidably mounted within the barrel 180 is a piston 182 which is fastened to the right-hand end of the push rod 162 so as to move the power piston 160 whenever the latter is moved to the right by fluid pressure acting against the left face thereof. A snap ring 183 is provided within the barrel 180 adjacent the left end thereof to limit the relative movement between the piston 182 and the barrel 180, and to move the barrel 180 into the inoperative position, as will be described.

The right-hand end of the master cylinder 164 contains an internally threaded opening 184 and has a shoulder 186 spaced inwardly therefrom supporting the end of the barrel 180.

A cylindrical fitting 188 is threadedly mounted within the opening 184 and receives the end of the conduit 32 which leads to the cross-over valve 30.

The fitting 188 also includes an inwardly extending tubular portion 190 which supports a sealing member 192 which is maintained in position by a retainer 194 removably fastened on the end of the tubular portion 190. The sealing member 192 is adapted to receive the end of the barrel 180 in sealing engagement so as to prevent the escape of fluid from within the barrel 180 to the space between the barrel 180 and the master cylinder 164 during operation of the device.

A flat ring 196 is carried within the barrel 180 and is maintained in contact with the left face of the retainer 194 by a coiled spring 198 which bears against a shoulder 200 formed in the interior of the barrel 180. The ring 196 does not prevent the flow of fluid between the interior of the barrel 180 and the space between the barrel 180 and the master cylinder 164, but restricts it somewhat, for a purpose to appear. Thus, when the device is inoperative, the interior of the master cylinder barrel 180 is always filled with fluid from the reservoir 112 and the piston 182 and the barrel 180 are to the left as shown more particularly in Fig. 3.

When the power piston 160 is moved to the right by the fluid from the gear pump 134, as when the piston 148 is moved against the valve seat 156 as previously described, the push rod 162 and the piston 182 fastened to the end thereof, move to the right.

Because of the friction between the piston 182 and the inner surface of the barrel 180, the piston 182 carries the barrel 180 with it as it moves to the right until the end of the barrel 180 seats against the sealing member 192 so as to prevent the escape of fluid from within the barrel to the space between it and the master cylinder 164. Thereafter, continued movement of the piston 182 to the right causes the fluid to be forced through the conduit 32 and into the cross-over valve 30.

When the fluid pressure to the left of the power piston 160 is reduced so as to permit the push rod 162 and the piston 182 to be moved to the left under the action of the spring 174, the barrel 180 will move to the left and away from the sealing member 192 after a decrease in the pressure within the barrel 180, either due to the friction between the piston 182 and the inner surface of the barrel 180, or by the piston 182 engaging the ring 183.

As shown in Fig. 1, the cross-over valve 30 includes a housing 202 which contains an opening 204 for receiving the conduit 36 leading to the actuating cylinder 16, and opposed openings 206 and 208 for receiving the conduits 32 and 34, respectively. Within the housing is a valve member 210 which is adapted to move between the openings 206 and 208 so as to connect the conduit 36 with either the conduit 32 or the conduit 34, depending upon which contains fluid at the higher pressure. Thus, when the power cluster 14 is in operation so as to cause increased fluid pressure in the conduit 32, the valve member 210 is moved to the right to close off the conduit 34 and permit the increased fluid pressure to be transmitted through the conduit 36 to the actuating cylinder 16.

Although only one actuating cylinder is shown, it is understood that additional cylinders may be connected to the conduit 36 in like manner.

The actuating cylinder 16, which is shown schematically in Fig. 1, is of conventional construction and includes a cylindrical housing 212 in which is mounted a piston 214 connected to a brake shoe 216.

An opening 218 is provided adjacent the top of the housing 212 to receive the conduit 36 from the cross-over valve 30 so that the increased fluid pressure in the conduit 36 is transmitted to the piston 214 to actuate the brake shoe 216.

The housing 212 contains another opening 220 which receives the conduit 38 leading to the remote control bleeder 20, which is of conventional construction.

If either the power cluster 14 or the control valve 12 becomes inoperative, fluid pressure for energizing the actuating cylinder can be provided by the manually operable control cylinder 18, which is of conventional construction.

As shown schematically in Fig. 1, the control cylinder 18 contains a cylinder 222 in which is mounted a piston 224 actuated by a foot lever 226. The cylinder 222 contains an opening 228 which receives the end of the conduit 34 leading to the cross-over valve 30. Thus, when the foot lever 226 is depressed, the piston 224 moves to the right and forces the fluid through the conduit 34 and through the opening 208 into the cross-over valve 30. The increased pressure on the right side of the valve element 210 causes it to move to the left so as to close off the conduit 32 and permit the increased fluid pressure from the control cylinder 18 to be transmitted to the actuating cylinder 16 through the conduit 36.

Operation

Referring to Figs. 1, 3 and 4, it will be noted that the various parts of the system are in the inoperative position, i. e., all except the gear pump 134 which is circulating fluid into the left-hand end of the power piston assembly 123, past the end of the by-pass piston 148 and back to the pump 134, as previously described.

In order to actuate the brake shoe 216, the operator steps on the foot pad 70 of the power control valve 12 so as to impart a downward movement to the shaft 66 against the action of the spring 82. As the shaft 66 moves downwardly, the port 90 in the piston 92 is closed by the valve element 88, thereby preventing the escape of pressure fluid through it. Further downward movement of the shaft 66 causes a similar movement of the piston 92 so as to force fluid from the bore 94 outwardly through the outlet port 50 and into the conduit 28. Because the conduit 28 is connected to the fitting 142 in the lefthand end of the power piston assembly 123, fluid under pressure is admitted into the bore 140 to the left of the by-pass piston 148. The biasing spring 158 is relatively weak and therefore the fluid forces the by-pass piston rightwardly against the valve seat 156 which momentarily interrupts the circulation of fluid by the gear pump 134. As this circulation of fluid is interrupted, a relatively light pressure is immediately created which is effective against the left end of the power piston 160 and which also tends to force the by-pass piston 148 leftwardly away from the valve seat 156. However, as the operator continues the downward movement of the shaft 66 of the power control valve 12, the increasing pressure acting on the left end of the by-pass piston 148 serves to counteract the pressure developed by the gear pump 134.

Because additional fluid cannot be displaced from the control valve 12 when the by-pass piston 148 is in its extreme rightward position, the sleeve 84 is caused to move upwardly as the piston 92 continues to move downwardly. Thus, the upward movement of the sleeve 84 provides the additional space for the fluid being displaced by the piston 92.

It will be noted that the downward movement of the shaft 66 requires an increasing amount of manual force because the upward movement of the sleeve 84 causes a double compression of the spring 82. The double compression of the spring 82 provides the necessary pedal "feel" for the operator.

During the initial closing of the passageway through the fitting 154 by the by-pass piston 148, the gear pump 134 provides a pressure in the power cylinder 124 to the left of the power piston 160 so as to force the latter rightwardly against the biasing action of the return spring 174. This same rightward movement is imparted to the piston 182 through the push rod 162.

Because of the friction between the piston 182 and the master cylinder barrel 180, the latter is moved rightwardly against the sealing member 192 thereby closing off communication between the interior of the barrel 180 and the space between the barrel and the master cylinder 164. In the event that the friction between the piston 182 and the barrel 180 is not sufficient to move the barrel rightwardly, the restriction formed by the ring 196 causes a pressure differential between the interior of the barrel 180 and the space between the barrel and the master cylinder 164 and on opposite sides of the wall 181, so as to produce the same result.

Further rightward movement of the master cylinder piston 182 displaces fluid outwardly through the fitting 188 and into the connecting conduit 32.

The fluid entering the conduit 32 flows into the cross-over valve 30 through the opening 206 thereby causing a rightward displacement of the valve element 210 so as to close the entrance to the conduit 34. The fluid then flows outwardly through the opening 204 and into the conduit 36 leading to the actuating cylinder 16 so as to displace the piston 214 and cause the brake shoe 216 to contact the rotating brake wheel in the customary manner.

The pressure fluid in the conduit 36 is also in communication with the gauge 40 through the connecting conduit 42 so that the operator can determine the actual pressure existing in the conduit 36.

At this particular stage in the operation, the "slack" is removed from the entire system and there will be no additional fluid displacement required other than that required to overcome the expansion of the conduits and the distortion of the various operating parts. Thereafter, pressure will begin to build up at a relatively rapid rate in the power cylinder 124 to the left of the piston 160 which will move the piston 148 from its valve seat 156 so as to maintain a pressure in the power cylinder 124 to the left of the piston 160 which is balanced by the pressure created on the left side of the by-pass piston 148 by the operator upon actuation of the control valve 12. Thus, with the shaft 66 of the control valve 12 depressed a predetermined amount, a given pressure will be created on the left side of the by-pass piston 148 which will in turn restrict the opening between the right side of the piston 148 and the valve seat 156 to provide a proportional fluid pressure on the left end of the power piston 160. Consequently with every increase of the control pressure caused by the operator depressing the shaft 66 further downwardly, the by-pass piston 148 will vary the restricted opening at the right-hand end thereof in like manner to provide a proportional increase of fluid pressure in the power cylinder 124 to the left of the power piston 160.

When it is desired to release the brake units or to discontinue the braking application as described above, the operator merely relieves the manual force applied to the pad 70 of the control valve 12 whereupon the piston 92 will move upwardly under the influence of the spring 100 as the sleeve 84 moves downwardly to its original position under the action of the spring 82, the spring 82 also aiding in returning the shaft 66 to its original uppermost position.

At the same time, the by-pass piston 148 is returned to its extreme leftward position due to the action of the spring 158 aided by the pressure created by the gear pump 134, so as to permit free circulation of the pressure fluid between the power cluster 14 and the gear pump 134.

Upon the release of the fluid pressure on the left end of the power piston 160, the return spring 174, with the aid of the fluid pressure acting on the right end of the master cylinder piston 182, returns the pistons 160 and 182 to their original positions as shown.

Simultaneously with the leftward movement of the master cylinder piston 182, pressure fluid is permitted to return from the actuating cylinder 16, thereby permitting the brake units to return to their released positions.

Also, when the master cylinder piston 182 is moved to the left, the barrel 180 is returned to the left because of friction, or when the piston 182 contacts the ring 183 so as to disengage the right end from the sealing member 192 and re-establish fluid communication between the barrel 180 and the space between the barrel 180 and the master cylinder 164.

At this stage of the operation, any fluid loss which may have occurred during the actuation of the brake units, will be compensated for by fluid supplied from the remote control bleeder 20. The upper counterbore 48 in the power control valve 12 is always filled with fluid and will replenish any loss of fluid in the lower bore 46 through the opening 90 in the piston 92. Also, the reservoir 112 of the power cluster 14 will replenish any fluid lost from the gear pump 134 or the actuating cylinder 16.

In the event of a malfunction of the gear pump 134 or the power cluster 14, so as to make either of them inoperative, the operator can merely depress the foot lever 226 of the manually operable control cylinder 18 which will force pressure fluid into the connecting conduit 34 leading to the cross-over valve 30 so as to force the valve element 210 leftwardly thereby closing the opening 206 and permitting the pressure fluid from the control cylinder 18 to flow into the conduit 36 and to the actuating cylinder 16. So far as the brake units are concerned, this operation is the same as that described above when using the control valve 12, except that the operator directly creates the actuating pressure and necessarily uses a long pedal travel to obtain the necessary fluid displacement. The reservoir portion of the control cylinder 18 is also supplied with fluid from the remote control bleeder 20 through the connecting conduits 22 and 26, as previously described.

Thus, it is apparent that there has been provided a novel powered hydraulic brake assembly and a novel control valve which fulfill all of the objects and advantages sought therefor. A single power cluster can be used for supplying the required fluid under pressure for the operation of a number of brake units, the number of brake units being limited only by the size of the various parts of the power cluster. This is because the pressure is provided by the gear pump 134 and the master cylinder, and is not limited by the physical capabilities of the operator, as is the case when known control cylinders are used.

Furthermore, because a relatively small movement of the shaft 66 of the control valve 12 results in an application of the brake shoe 216, there is no need or desire for the operator to "drag" the brakes, as is usually the case when known types of control cylinders are used which require a long pedal stroke to effect operation of the brakes.

In addition the double compression of the spring 82 caused by the upward movement of the sleeve 84 as the shaft 66 is moved downwardly, provides an increase in the force resisting the downward movement of the shaft 66 so as to provide the necessary "feel" to the operator as he applies the brakes.

It is to be understood that the foregoing description and the accompanying drawings have been given only by way of illustration and example, and that changes and alterations in the present disclosure, which will be readily apparent to one skilled in the art, are contemplated as within the scope of the present invention which is limited only by the claims which follow.

What is claimed is:

1. A device of the type described, comprising a housing containing a fluid reservoir; a first cylinder fixedly positioned within the housing and containing a first piston reciprocally mounted therein; an inlet and an outlet adjacent one end of the cylinder to one side of the piston; fluid pressure producing means in communication with the inlet and the outlet for circulating fluid through the cylinder; means for restricting the flow of fluid from the cylinder; a second cylinder adjacent the other end of the first cylinder in axial alignment therewith and containing a second piston reciprocally mounted therein, the second cylinder having limited axial movement relative to the first cylinder so as to be movable between an inoperative position and an operative position upon movement of the second piston; means interconnecting the interior of the second cylinder and the reservoir when the second cylinder is in the inoperative position and closing off communication between them when the second cylinder is in the operative position; means interconnecting the first and second pistons for moving the second piston when the first piston is actuated; and a fluid pressure outlet from the second cylinder.

2. A device of the type described, comprising a housing containing a fluid reservoir; a first cylinder fixedly positioned within the housing and containing a first piston reciprocally mounted therein; an inlet and an outlet adjacent one end of the cylinder to one side of the piston; fluid pressure producing means in communication with the inlet and the outlet for circulating fluid through the cylinder; means for restricting the flow of fluid from the cylinder; a second cylinder within the housing adjacent the other end of the first piston in axial alignment therewith and containing a second piston reciprocally mounted therein, the second cylinder being open at the end opposite to the first cylinder; abutment means within the housing adjacent the open end of the second cylinder; the second cylinder having limited axial movement relative to the first cylinder and to the abutment means so as to be movable between an inoperative position in which the open end of the second cylinder is spaced from the abutment means and the interior of the second cylinder is in communication with the reservoir, and an operative position in which the open end of the second cylinder is in sealing engagement with the abutment means so as to prevent communication between the interior of the second cylinder and the reservoir; passage means in the abutment means in communication with the interior of the second cylinder when it is in the operative position; and means for transmitting the movement of the first piston to the second piston and the second cylinder.

3. A device of the type described, comprising a housing containing a fluid reservoir; a first cylinder fixedly positioned within the housing and containing a first piston reciprocally mounted therein; an inlet and an outlet adjacent one end of the cylinder to one side of the piston;

fluid pressure producing means in communication with the inlet and the outlet for circulating fluid through the cylinder; means for restricting the flow of fluid from the cylinder; a second cylinder within the housing adjacent the other end of the first piston in axial alignment therewith and containing a second piston reciprocally mounted therein, the second cylinder being open at the end opposite to the first cylinder; abutment means within the housing adjacent the open end of the second cylinder; the second cylinder having limited axial movement relative to the first cylinder and to the abutment means so as to be movable between an inoperative position in which the open end of the second cylinder is spaced from the abutment means and the interior of the second cylinder is in communication with the reservoir, and an operative position in which the open end of the second cylinder is in sealing engagement with the abutment means so as to prevent communication between the interior of the second cylinder and the reservoir; passage means in the abutment means in communication with the interior of the second cylinder when it is in the operative position; and movement transmitting means interconnecting the first and second pistons; the second piston being in frictional contact with the second cylinder so as to cause the latter to be moved to the operative position when the second piston is moved toward the open end of the second cylinder.

4. A device of the type described, comprising a housing containing a fluid reservoir; a first cylinder fixedly positioned within the housing and containing a first piston reciprocally mounted therein; an inlet and an outlet adjacent one end of the cylinder to one side of the piston; fluid pressure producing means in communication with the inlet and the outlet for circulating fluid through the cylinder; means for restricting the flow of fluid from the cylinder; a supporting member positioned within the housing and containing a cylindrical wall; a second cylinder mounted within the housing in sliding engagement with said wall and having limited axial movement relative thereto, said second cylinder being open at one end; abutment means having a passageway therethrough disposed adjacent the open end of the second cylinder and containing sealing means for sealing engagement with said open end; a second piston reciprocally mounted within the second cylinder; and means interconnecting the second piston with the first piston.

5. A device of the type described, comprising a housing including a side wall and containing a fluid reservoir; a first cylinder fixedly mounted within the housing and containing a first piston reciprocally mounted therein; an inlet and an outlet adjacent one end of the cylinder to one side of the piston; fluid pressure producing means in communication with the inlet and the outlet for circulating fluid through the cylinder; means for restricting the flow of fluid from the cylinder; a supporting and guiding member mounted within the housing adjacent the other end of the first cylinder and containing a side wall and a tubular portion normal thereto; an aperture in the side wall; a second cylinder mounted within the housing in axial alignment with the first cylinder and having one end thereof in sliding engagement with said tubular portion of the supporting and guiding member; the other end of the second cylinder being open and extending to adjacent the side wall of the housing; passage means connecting the reservoir and the space around the open end of the second cylinder; an outlet in the side wall of the housing in alignment with the open end of the second cylinder; and sealing means about the outlet for receiving the open end of the second cylinder in fluid-sealing engagement; a second piston reciprocally mounted within the second cylinder in frictional contact with the wall thereof; and a push rod extending through the side wall of the supporting and guiding member interconnecting the first and second pistons.

6. A device of the type described, comprising a first cylinder having a first piston reciprocally mounted therein, an inlet and outlet adjacent to one end of the first cylinder to one side of the piston therein, fluid pressure producing means in communication with the inlet and the outlet for circulating fluid through the first cylinder, valve means for restricting the flow of fluid from the first cylinder, a second cylinder adjacent to the other end of the first cylinder and having a second piston reciprocally mounted therein, coupling means connecting the first and second pistons whereby the latter is moved when the former is actuated, said second cylinder having limited axial movement between an inoperative position and an operative position upon movement of the second piston, a fluid chamber in communication with the interior of the second cylinder when the latter is in the inoperative position, said fluid chamber being sealed from the interior of the second cylinder when the latter is moved to the operative position, and an outlet from the second cylinder.

7. The device according to claim 6 wherein said fluid chamber comprises a housing circumscribing said second cylinder and being in spaced relation therewith, said housing having an end wall with an outlet opening axially aligned with the outlet of the second cylinder, said second cylinder being spaced from the end wall in inoperative position and being moved into sealing abutment with the end wall when in the operative position.

References Cited in the file of this patent

UNITED STATES PATENTS

| | | |
|---|---|---|
| 1,743,367 | Maybach | Jan. 14, 1930 |
| 1,921,590 | Staude | Apr. 8, 1933 |
| 1,960,996 | Guernsey | May 29, 1934 |
| 1,962,857 | Cash | June 12, 1934 |
| 1,997,062 | Huffman | Apr. 9, 1935 |
| 2,136,318 | Rossmann | Nov. 8, 1938 |
| 2,318,756 | Chouings | May 11, 1943 |
| 2,374,909 | Williams | May 1, 1945 |
| 2,444,181 | Baldwin | June 29, 1948 |
| 2,477,758 | Majneri | Aug. 2, 1949 |
| 2,505,213 | Schnell | Apr. 25, 1950 |
| 2,517,005 | MacDuff | Aug. 1, 1950 |
| 2,569,028 | Stryker | Sept. 25, 1951 |
| 2,661,597 | Edge | Dec. 8, 1953 |
| 2,687,189 | Schnell | Aug. 24, 1954 |